UNITED STATES PATENT OFFICE.

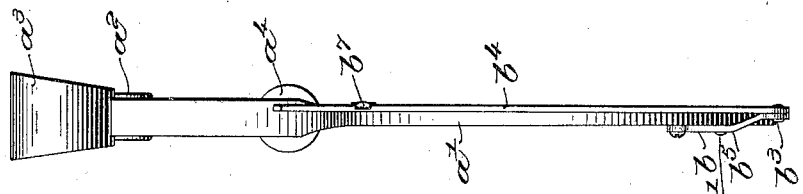
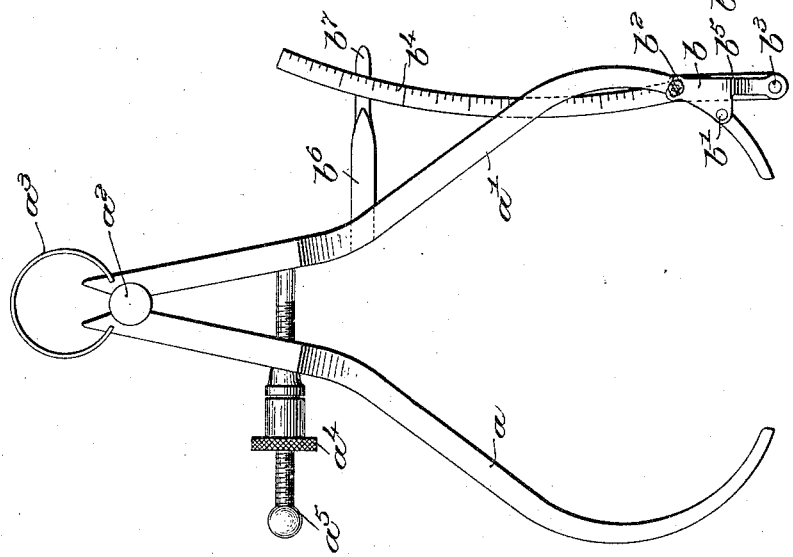
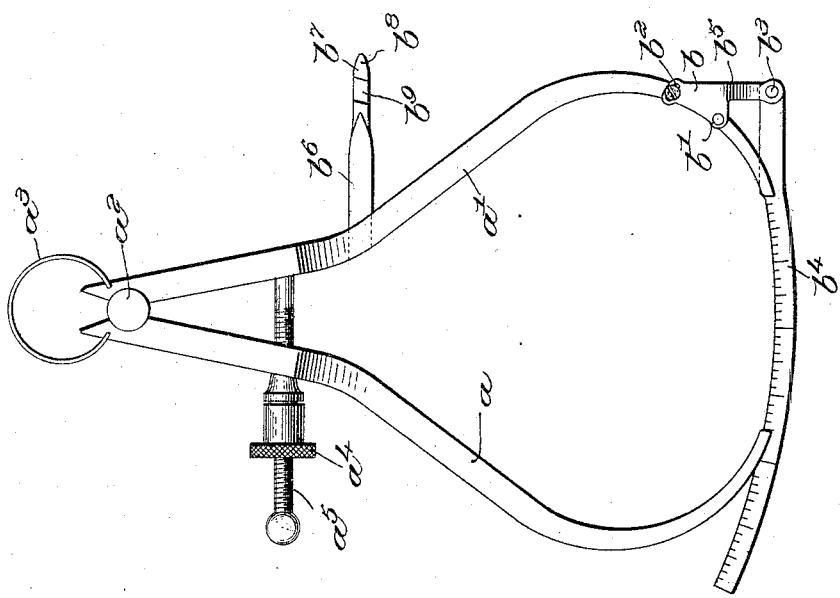

FRANK A. HATCH, OF HANSON, MASSACHUSETTS, ASSIGNOR TO WALTER E. TRUFANT, OF WHITMAN, MASSACHUSETTS.

CALIPERS.

SPECIFICATION forming part of Letters Patent No. 726,287, dated April 28, 1903.

Application filed March 28, 1902. Serial No. 100,363. (No model.)

*To all whom it may concern:*

Be it known that I, FRANK A. HATCH, a citizen of the United States, residing at Hanson, county of Plymouth, State of Massachusetts, have invented an Improvement in Calipers, of which the following description, in connection with the accompanying drawings, is a specification, like letters on the drawings representing like parts.

My invention is an improved caliper, and has for its object the provision of means for enabling the user to ascertain accurately the distance between the jaws of the caliper, the measuring device being carried thereby in such position as not to interfere with the normal use of the caliper, and yet be ever ready at hand for use.

Stated in general terms, my invention comprises the application to one leg of the instrument of a rule or measure arranged to be moved in position to span the jaws or distance from one leg to the other whenever it is desired to set the calipers or ascertain the distance to which they are set and being then movable instantly back to be retained out of said position at one side of the instrument.

In the drawings, in which I have shown one embodiment of my invention, Figures 1 and 2 represent the same in front elevation, the former figure showing my invention in one position to measure the gap between the caliper-legs, and the other figure showing the same locked in inoperative position; and Fig. 3 is an edge elevation looking at the right-hand side of Fig. 2.

It will be understood that my invention is applicable to any usual or preferred kind of calipers, that herein shown comprising legs $a\ a'$, pivoted at $a^2$ and normally held under tendency to separate by a spring $a^3$, being adjusted by a thumb-nut $a^4$ and threaded arm $a^5$.

At a convenient place, preferably adjacent the free end of one of the legs, I secure a bracket $b$, herein shown as pivotally mounted at $b'$ and adjustable at $b^2$, for the purpose of taking up wear of the jaws or ends of the legs of the calipers or accommodating the measuring device to any special circumstances. At its outer end at $b^3$ is pivoted a rule or measuring device $b^4$, said bracket being offset at $b^5$, as clearly shown in Fig. 3, to permit the rule to swing from the position shown in Fig. 1 to the position shown in Fig. 2, being engaged in the latter position by any convenient locking or retaining device, the same being herein shown as comprising an arm $b^6$, provided at its free end with a spring-finger $b^7$, having a beveled outer end $b^8$ and a notch $b^9$, so that when the rule $b^4$ is swung against said finger it strikes the beveled end $b^8$ and springs the same back until the rule enters the notch $b^9$ and is locked in immovable position thereby.

It will be observed, viewing Fig. 3, that the parts are in such position that the rule rests substantially in the plane of the calipers and is held rigidly and snugly by reason of the fact that the bracket $b$ is secured on one side of the caliper-leg and the locking device on the other side thereof, while the rule is held between the contiguous sides of the caliper-leg and the locking device. Preferably, also, the rule is curved in an arc having the pivot $a^2$ as its center, so that as the leg $a$ moves away from the leg $a'$ its measuring end will follow along the edge of the rule without requiring the latter to be changed in position.

In use if it is desired to set the calipers to any given measurement the rule $b^4$ is simply unlocked and swung around from the position shown in Fig. 2 to that shown in Fig. 1, and then the calipers are adjusted by the rule. Having adjusted the calipers, the rule is simply swung around on its pivot $b^3$ and snapped into the locking device $b^6$. If the ends of the caliper-legs should become worn, the bracket is adjusted at $b^2$ so as to bring the rule into accurate position again.

I prefer the pivotal mounting of the measuring device, as it insures that the latter cannot shift to the right or left, viewing Fig. 1, but will always bring the same starting-point to coincide with the end of the leg $a'$, whereas if the rule $b^4$ were mounted to slide, for instance, over said leg $a'$ it would be necessary to see each time that it had been brought to the correct position before attempting to measure by it. However, it will be understood that I do not limit my invention to the precise construction and arrangement shown, as many changes may be resorted to without departing from the spirit and scope of my invention.

I am aware that various devices have been provided for measuring the distance to which caliper and divider legs are adjusted; but I am not aware that any means have been provided for determining the exact distance apart at the jaws or ends of the legs, and also in other particulars I regard my invention as new, as will be more fully pointed out in the course of the following claims.

Having described my invention, what I claim as new, and desire to secure by Letters Patent of the United States, is—

1. Calipers having a rule attached thereto and movable into and out of position to span across the gap or jaw formed between the ends of the legs of the calipers, said rule being secured at the outer side of one of the caliper-legs and when in inoperative position being entirely away from the said ends of the legs, and the space inclosed by the legs of the calipers being then unobstructed and free to receive any object to be measured, and means for releasably locking said rule in said inoperative position.

2. Calipers, provided with a rule pivotally mounted on one leg of the calipers to swing into alinement with the extremities of the legs of the calipers for measuring across the gap between the said two legs and to swing out of said position along one side of the calipers, leaving the space inclosed by the legs of the calipers unobstructed and free to receive any object to be measured, and a retaining device for locking said rule in its position along one side of the calipers.

3. Calipers provided with a rule pivotally mounted on one leg of the calipers to swing into position for measuring across the gap between the two legs of the calipers and to swing out of said position along one side of the calipers, and means for adjusting the position of the pivotal bearing of said rule.

In testimony whereof I have signed my name to this specification in the presence of two subscribing witnesses.

FRANK A. HATCH.

Witnesses:
ALBERT H. BRIGHAM,
G. HOWARD SOULE.